United States Patent [19]

Friese et al.

[11] Patent Number: 4,920,698
[45] Date of Patent: May 1, 1990

[54] POWERED SLIDING TRUCK CAB WINDOW

[75] Inventors: Donald E. Friese, Northridge; James W. Brown, Costa Mesa; Frank MacEwen, Anaheim; E. G. LeVan, Long Beach; Michael Smith, Torrance, all of Calif.

[73] Assignee: Noran, Sherman Oaks, Calif.

[21] Appl. No.: 264,216

[22] Filed: Oct. 28, 1988

[51] Int. Cl.$^5$ .............................................. E06B 1/00
[52] U.S. Cl. ........................................ 49/380; 49/125; 49/362
[58] Field of Search ................. 49/380, 349, 362, 360, 49/125; 206/325

[56] References Cited

U.S. PATENT DOCUMENTS

| | | | |
|---|---|---|---|
| 3,174,742 | 3/1965 | Stelzer | 49/349 |
| 3,237,250 | 3/1966 | Scoville | 49/136 |
| 3,444,649 | 5/1969 | Rivolier | 49/352 |
| 3,706,163 | 12/1972 | Pickles | 49/362 |
| 3,893,260 | 7/1975 | Cadiou | 49/362 |
| 4,081,926 | 4/1978 | Jardin | 49/223 |
| 4,090,329 | 5/1978 | Rampel | 49/352 |
| 4,158,270 | 6/1979 | Cherbourg et al. | 49/103 |
| 4,182,078 | 1/1980 | Bartholomew | 49/362 X |
| 4,671,013 | 6/1987 | Friese et al. | 49/380 |
| 4,793,099 | 12/1988 | Friese et al. | 49/380 |

FOREIGN PATENT DOCUMENTS

| | | | |
|---|---|---|---|
| 709660 | 8/1931 | France | 49/362 |
| 1199868 | 12/1959 | France | 49/362 |
| 1410588 | 8/1965 | France | 49/362 |

Primary Examiner—Philip C. Kannan
Attorney, Agent, or Firm—Spensley, Horn, Jubas & Lubitz

[57] ABSTRACT

A slidable pane power window assembly for mounting in the rear window of truck cabs is disclosed. The assembly comprises a frame dimensioned to fit in the rear window opening of a truck cab and fitted with one or more fixed and slidable window panes. A slidable pane is moved horizontally into an opened and closed position by a rack and pinion drive, wherein a rack affixed to the slidable pane is engaged by a pinion powered by a motor connected to the pinion via power transmission cable. Another embodiment uses a push-pull mechanism for operating the window.

12 Claims, 8 Drawing Sheets

POWERED SLIDING TRUCK CAB WINDOW

BACKGROUND OF THE INVENTION

1. Field of the Invention

The present invention relates generally to power window modules and more specifically to window replacement assemblies for use in a rear cab opening of a truck.

2. Description of the Prior Art

In typical pickup truck cabs, as mass produced by various manufacturers, the rear of the cab has a generally trapezoidal shaped window opening into which a solid, immovable piece of glass is fitted. A window gasket secures the glass n that opening.

Consumers, however, have found it desirable to be able to open the rear window of the cab to improve ventilation in the cab. Some automobile accessory manufacturers have attempted to meet this demand for windows that can be opened by providing substitute window assemblies. These substitute assemblies house split, horizontally sliding windows. To install such windows, the original glass pane provided by the manufacturer is removed with the gasket. After the gasket is separated from the original glass pane, the substitute sliding window assembly is inserted in place of the original window in the gasket.

Typically, in such prior art sliding window assemblies, the area within the window frame is divided into three panes; the middle pane is adapted to slide past at least one of the other panes. However, such substitute windows are operated manually and therefore have several shortcomings. The window is located substantially behind the driver and out of the driver's field of vision. Thus, the driver cannot safely open or close the window while driving.

Other prior art substitute modular windows use electro-mechanical systems to fully retract a single rear window pane into a frame disposed within the track cab. Although these power window modules represent a significant improvement over the unpowered, earlier prior art designs, they also have certain shortcomings.

One such prior power window module is disclosed in U.S. Pat. No. 4,119,341 to Cook. U.S. Pat. No. 4,119,341 uses a motor powered gear and lever arm system for raising and lowering a single glass pane. Because of the substantial weight of the glass pane, the motor required for providing the mechanical power to raise and lower the window must be quite powerful. Such motors are expensive and noisy.

A second prior art power window is disclosed in U.S. Pat. No. 4,671,013 to Friese et al. U.S. Pat. No. 4,671,013 discloses a power window module wherein a complicated pulley system driven by a motor raises and lowers one pane of glass. Using this pulley system allows the use of quieter, less powerful motors. However, the unit still has several shortcomings. Its bulk, which makes installation difficult, and the expense of manufacturing the unit inhibit consumer acceptance of these types of designs.

Finally, a prior art power window module disclosed in U.S. Pat. Application Ser. No. 07/100,126 to Friese et al. represents an improvement on the prior designs. This application discloses a power window module which overcomes some of the shortcomings of U.S. Pat. No. 4,671,013 by replacing the pulley system with a pair of slotted tapes which are driven by a motor to raise and lower a single glass pane. This module, however, shares several shortcomings with U.S. Pat. No. 4,671,013 in that the module is difficult to install because of its bulk and is expensive to manufacture. Also, as in the other prior art power window modules, if they fail with the window in the open position, the window cannot be readily closed until the unit is repaired.

All three prior art power window modules discussed above share an additional limitation. They cannot be installed into a truck cab if the rear cab wall is not nearly vertical or if the truck has a second row of seats such as those found in some "king cabs."

OBJECT OF THE INVENTION

It is an object of the present invention to provide a power window assembly which overcomes the above described shortcomings of the prior art power window assemblies. Three embodiments are disclosed that are mechanically reliable and substantially less expensive to manufacture than the prior art power window modules. Each disclosed embodiment is also easier to install and may be installed in truck cabs where the rear wall is not vertical or where trucks have "king cabs".

Each embodiment has a replacement window frame assembly dimensioned to fit into the rear window opening of a truck cab. Two window panes are fixedly mounted and a third pane is slidably mounted in the frame.

The replacement window assembly frame of each embodiment of the present invention is also equipped with a power drive unit. That power drive unit drives the slidably mounted pane from a fully closed position to a fully opened position. In the fully opened position, the slidable pane is at least partially behind or in front of one of the fixedly mounted panes.

Four alternative drive units are disclosed. In one unit, an elongated, toothed rack is affixed to the slidable pane. A rotatable pinion (or gear) with teeth is positioned adjacent to the rack. As the pinion rotates when the power drive is energized, the teeth of the pinion engage the teeth of the rack. The interaction of the rack and pinion translate the rotational motion of the pinion into the translational (sliding) motion of the window pane.

In this first embodiment, the power drive unit has a reversible motor which is connected to the pinion by a power transmission cable assembly. The power transmission cable comprises a hollow exterior cable housing an elongated rotating member or a spline. A mating socket provided in the motor secures one end of the spline with the aid of a threaded coupling. The other end of the spline is firmly affixed to a socket in the pinion. As the rotating member of the motor rotates, it rotates the spline which, in turn, rotates the pinion to cause the window pane to slide towards the opened or the closed position. By reversing the direction of the rotation of the motor, the rotation of the pinion reverses; that also reverses the direction of movement of the slidable window pane. By using the power transmission cable, the motor may be mounted in a spot remote from the driver's ears. This lowers the effective noise level heard from the unit by the driver.

Thus, the unit is extremely quiet. In addition, there are relatively few parts so the cost of this power window assembly is approximately one-third of the cost of the prior art power window assemblies. Also, unlike the prior art power window assembles, the truck driver may readily close the window by unscrewing the threaded coupling between the motor and the power transmission cable. Due to its more compact size, the disclosed power window assembly may be more readily installed.

The second embodiment differs from the first embodiment by eliminating the power transmission cable and securing the motor directly to the pinion.

The third and fourth embodiments use a "push-pull" mechanism. A hollow cable connects the motor and the frame. A second cable housed within the hollow cable couples the motor to the window pane. The motor includes a transmission drive mechanism that retracts or pulls a portion of the interior cable into the drive mechanism to move the window towards the fully opened position; the drive mechanism pushes a portion of the interior cable out of the drive mechanism to move the window towards the fully closed position. In the third embodiment, friction is used to provide the force to retract or push out the second cable. In the fourth embodiment, a gear wheel coupled to the motor causes a slotted tape to reciprocate, thereby furnishing the pushing and pulling action on the second cable.

Like the first two embodiments, these third and fourth embodiments are also quiet, inexpensive to manufacture and the window may be readily, manually closed if the power mechanism becomes inoperative.

BRIEF DESCRIPTION OF THE DRAWINGS

The embodiments of the invention will become better understood by reference to the following detailed description when read with the accompanying drawings showing the embodiments of the invention, wherein.

DETAILED DESCRIPTION OF THE PREFERRED EMBODIMENTS OF THE INVENTION

Figure 1:
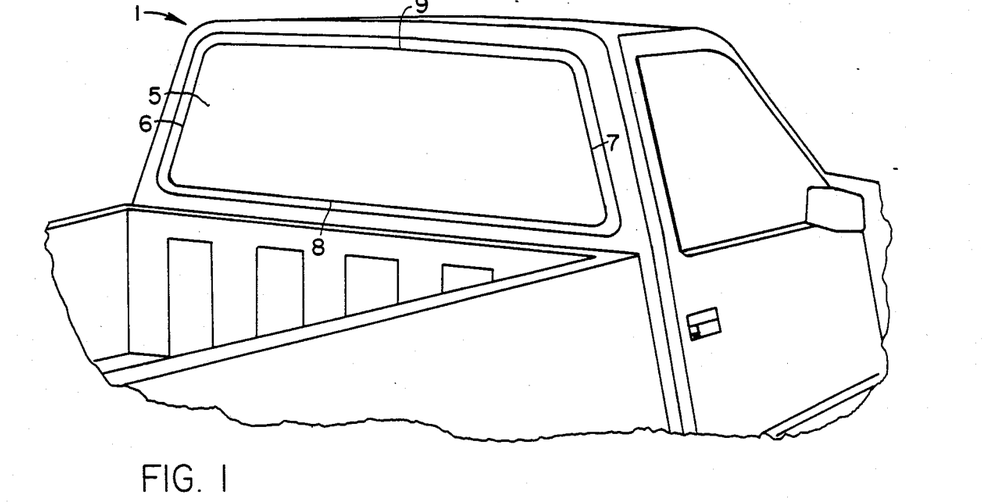
FIG. 1 shows a rear perspective view of the rear window opening of a pickup truck cab after the original window pane has been removed.

FIG. 1 shows a truck cab 1 with a typical rear window opening 5 after removal of the original fixed rear window pane. The rear window opening 5 has a substantially trapezoidal shape. Side edges 6 and 7 and lower edge 8 and an upper edge 9 defining the opening. A pinchweld flange (shown in FIG. 4 of U.S. Pat. No. 4,361,017) is formed along all four edges. In such prior art truck cabs, an original gasket with an "S" shaped cross-section (shown in FIGS. 3 and 4 of U.S. Pat. No. 4,361,017) is mounted about the window opening to secure the original pane. The pinchweld flange is fitted into a rear channel formed along the perimeter of the original gasket and the original plate glass window (not shown) provided by the truck manufacturer is mounted in the front channel formed along the inner edge of the gasket.

Figure 2A:
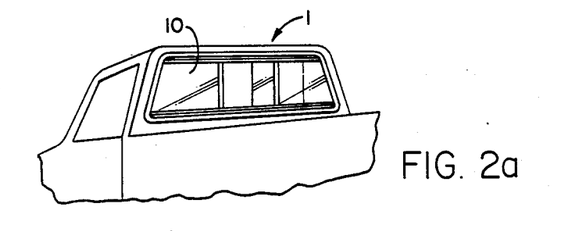
FIGS. 2A and 2B show two rear perspective views of a pickup truck cab incorporating an embodiment of the inventive power window assembly with the slidable pane in a partially opened position.
Figure 2B:
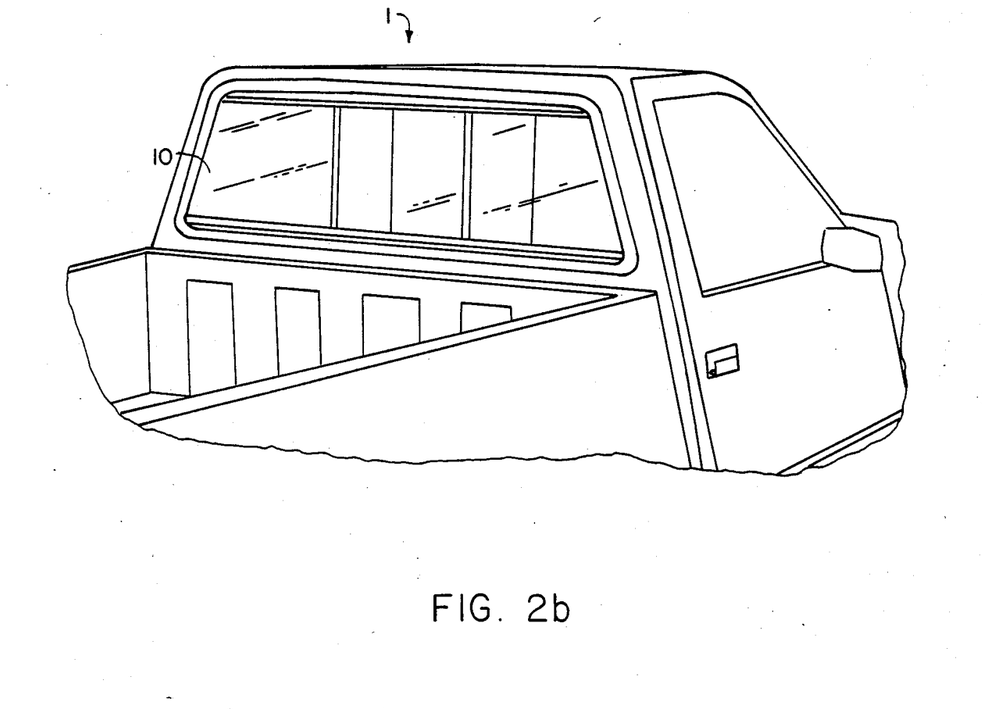

FIG. 2 shows two views truck cab 1 with an embodiment of the power window assembly 10 of the present invention installed. The assembly 10 is substituted for the original plate glass window provided by the manufacturer.

Figure 3:
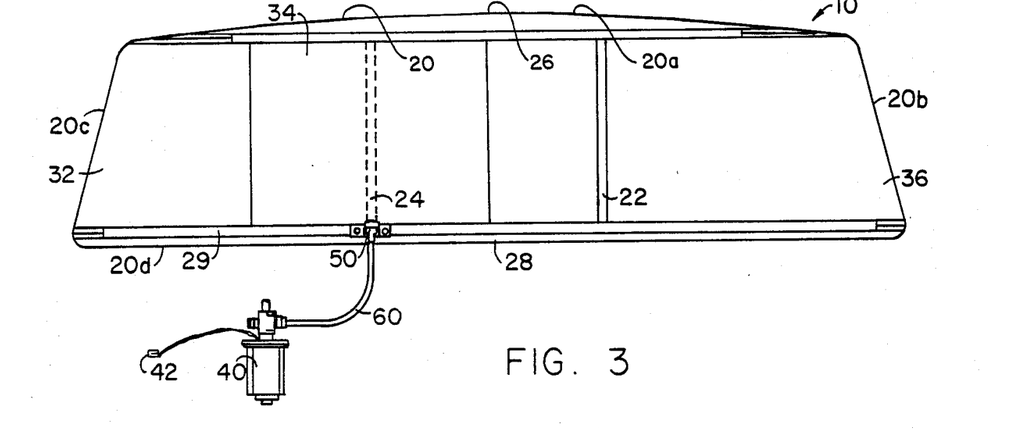
FIG. 3 is a front planar view of the first embodiment of the inventive window assembly.

Referring now to FIG. 3, it can be seen that the power window assembly 10 comprises a frame 20 configured to fit within the rear window opening of a truck cab. The frame includes two fixed glass window panes 32 and 34 and the frame has a substantially trapezoidal shape with a left side edge 20c, a right side edge 20b, and a bottom edge 20d that is longer than the upper edge 20a. The frame also include the left and right mullions 22 and 24 which act as vertical braces to improve the structural strength of the frame 20. In the preferred embodiment, the frame 20 and the mullions 22, 24 are made of extruded aluminum.

Figure 7:
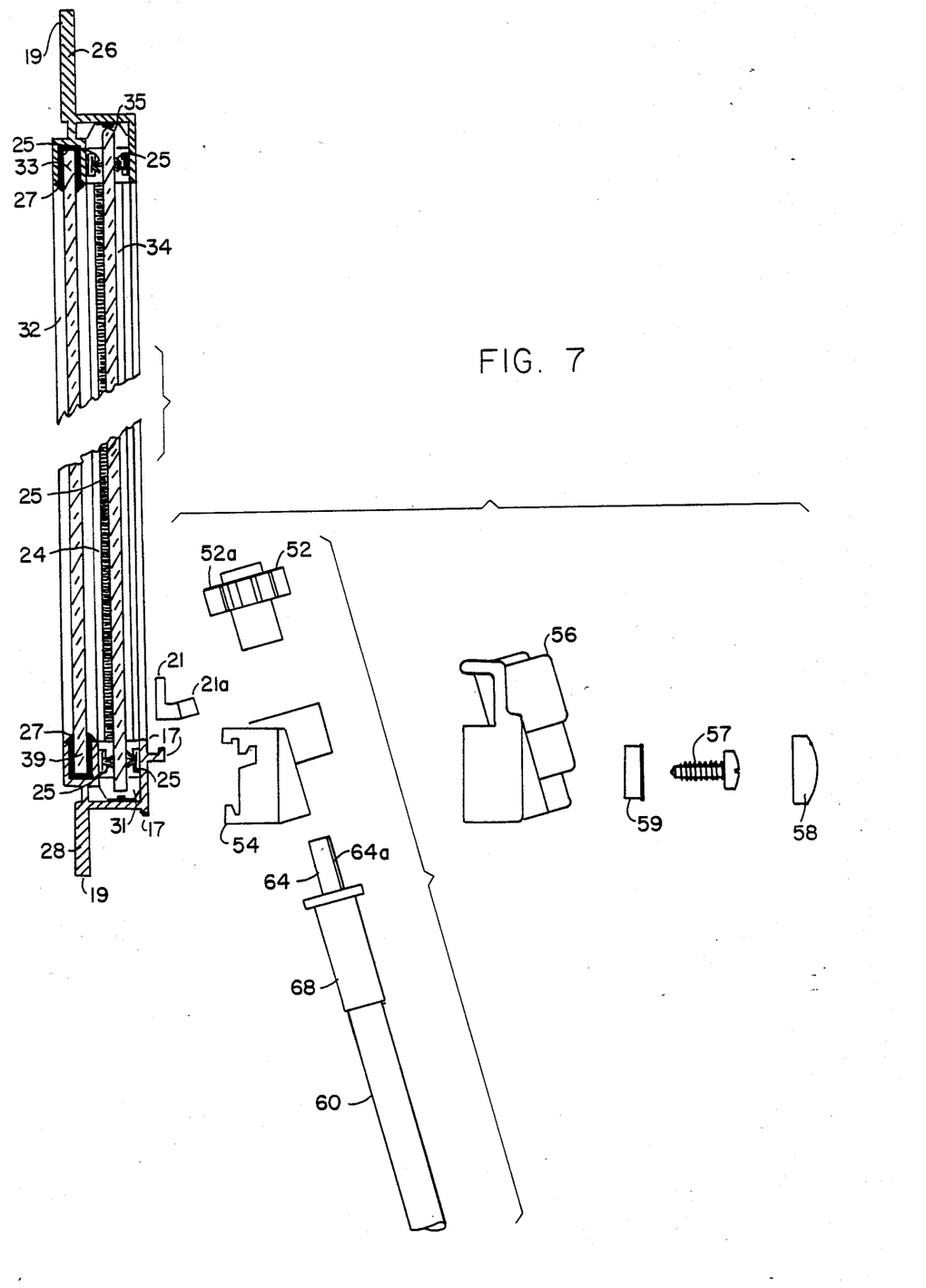
FIG. 7 is a partial exploded sectional view of the first embodiment taken along line 7—7 of FIG. 3.

As can be seen in FIG. 7, the frame 20 is configured to be inserted into the front channel of the gasket where the glass plate window is originally mounted. All of the frame edges are molded into a rim 19 that fits into the front channel of the gasket. Upper frame portion 26 defines two parallel channels, a front channel 35 and a rear channel 33. Similarly, lower frame portion 28 defines a front channel 31 and a rear channel 39.

Figure 6:
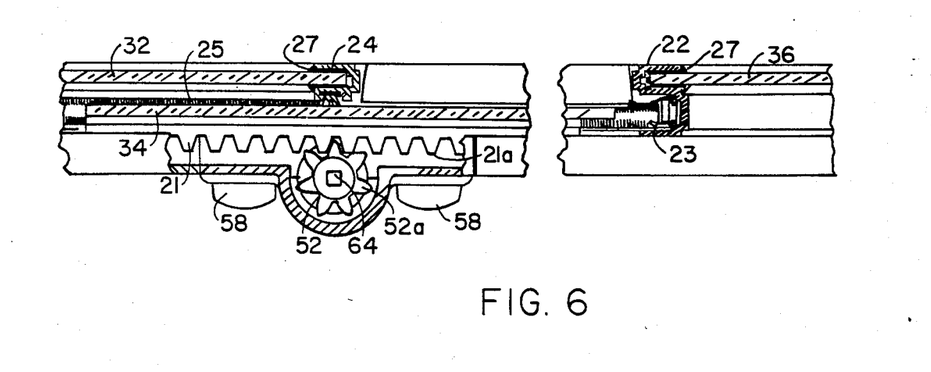
FIG. 6 is a partial sectional view of the first embodiment shown in FIG. 3 taken along line 6—6 of FIG. 3.

In the first embodiment shown in FIG. 3, three window panes 32, 34, and 36 are mounted in the frame. The panes are made of a substantially transparent material such as glass or plexiglass or other hard plastic. Two panes of approximately equal size 32 and 36 are mounted in the rear channels 33 and 39, filling approximately the left third and the right third of the frame 20, respectively. These two panes, 32 and 36 are held in place by ordinary window gaskets 27 (FIG. 6). The left pane 32, is dimensioned to fit into the frame so that one edge of the pane forms the left edge of the frame 20c. The right pane 36 is dimensioned to fit into the frame so that one edge of the pane forms the right edge of the frame 20b.

To mount the power window assembly 10 into the truck cab 1, the original gasket and the original pane are removed. The edges of the frame 20a-d are fitted into the front channel of the gasket and the gasket is refitted over the pinchweld.

The third pane 34 (FIG. 7), is slidably mounted in the front channels 35 and 31. This sliding pane 34 slides between a fully closed position when it is slid as far as possible towards the right pane 36. In the fully closed position, the sliding pane 34 occupies approximately the middle third of the interior space of the frame 20. When the sliding pane 34 is slid in its channels to a position that is almost completely in front of the left pane 32, the window pane 34 is in the fully opened position.

As can be seen in FIG. 7, the left mullion 24 is positioned behind the front channel. By placing the mullion 24 in that position, the weather stripping 25 mounted vertically on the front surface of the left mullion 24 contacts the rear surface of the sliding pane 34. This allows the weather stripping to remove moisture from the rear surface of the pane 34 as the pane slides towards the fully opened position. Weather stripping 25 is also mounted horizontally on both the front and rear surfaces of the top and bottom front channels 31 and 35 (FIG. 7) to prevent water from entering the truck cab.

Figure 14A:
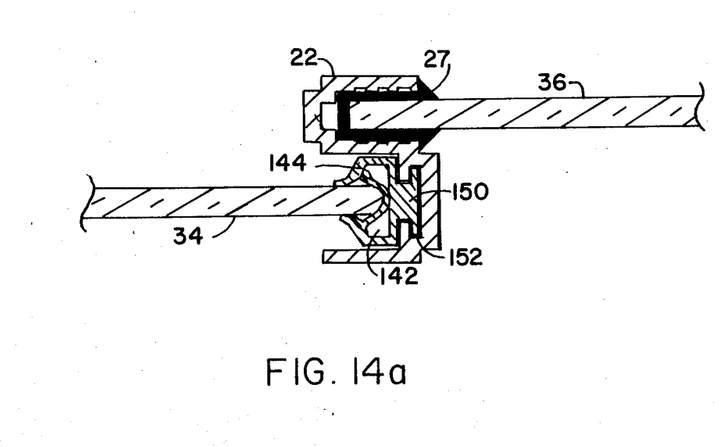
FIGS. 14A and 14B are cross sectional views of the right mullion 22 shown in either FIG. 3 or FIG. 8.

As a security precaution, the window frame has a right mullion 22 with an "S" shaped cross section. (See FIGS. 14A and 14B). The "S" shaped cross section of the mullion prevents thieves or others from using a screwdriver or the like to pry open the sliding pane 34 when that pane is in the closed position. As shown in FIG. 14A, the mullion 22 shields the rear or exterior side of the right dge of the window pane 34—thereby preventing a screwdriver from being able to pry at the right edge of the window pane 34 while it is closed.

An additional feature of the right mullion is the use of a specialized pinch gasket 140 that is housed within the portion of the mullion 22 above the front channel 31 of the bottom of the frame 28 and below the front channel 35 of the top of the frame 26. That pinch gasket, which is made of a thermoplastic rubber such as Kraton from Shell Chemical Co., having a hardness of a 60 shore A scale, extends along virtually the entire vertical length of the mullion 22 to provide a watertight seal.

Figure 14B:
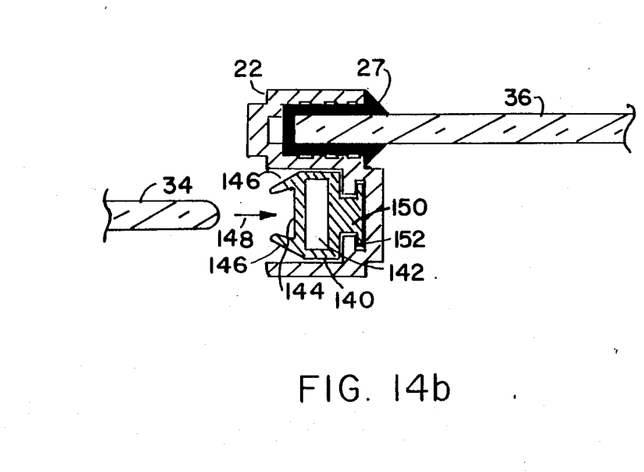

Whenever the window is not in the fully closed position (FIG. 14B), the cross section of the pinch gasket is substantially that shown in FIG. 14B. Two opposed fingers 146 extend from a thin, flat, collapsible cross member 144 to separate a collapsible channel 142 from the exterior. The remainder of the cross section 150 of the pinch gasket 140 resembles the cross section of an I beam and conforms to a channel 152 defined by the front section of the mullion 22.

When the window pane 34 is in the fully closed position, the pinch gasket 140 has the cross section shown in FIG. 14A. The edge of the pane presses against the collapsible cross member 144. The pressing of the pane against the member 144 collapses the gasket chamber 142 and causes the fingers 146 to pinch in on the glass pane 34 to provide a watertight seal.

The power window assembly 10 further comprises a reversible rotating electrical motor 40 (FIG. 3) and a power transmission cable 60 to couple the rotational motion of the motor 40 to the window pane 34. The motor 40 has a wiring harness 42 that may be coupled to a double throw switch (not shown) with a center off position to control the motor. The motor may be a 12 volt D.C. right angle gear motor that reverses its direction of rotation when the polarity to the D.C. motor is reversed. Such motors include United Technologies Electro Systems' Model 50765-28-M015MM motor.

Figure 4:
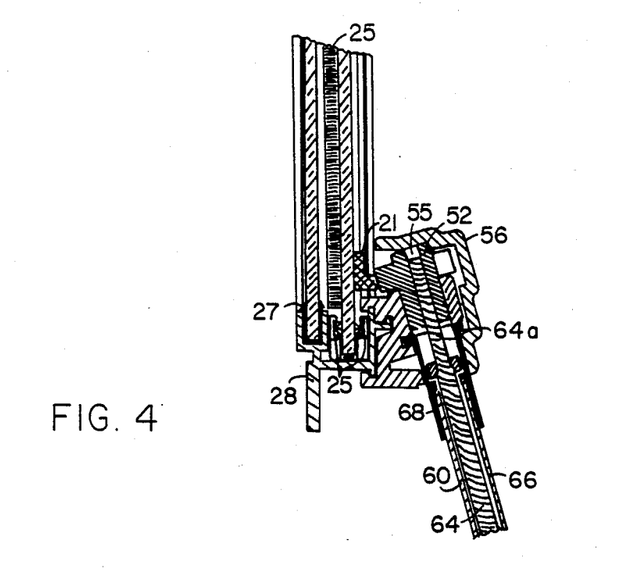
FIG. 4 is a partial sectional view of the window assembly of the first embodiment taken along line 4—4 of FIG. 3.

As shown in FIGS. 4 and 6, a power transmission cable 60 couples the motor 40 to a pinion 52 adjacent to the sliding pane 34. A toothed, elongated rack 21 and the toothed pinion (or gear) 52 cooperate to translate the rotational motion of the motor 40 as transmitted through the cable 60 into the translation motion of the sliding window pane 34. The rack 21 is horizontally affixed to the bottom of the sliding pane 34 by any of a number of common glass adhesives such as those offered by LOC-TITE. The rack is preferably made of extruded aluminum.

The pinion 52, which is preferably made of nylon to reduce noise, is held adjacent to the rack 21 by the inner and outer pinion housings 54 and 56, which may be made of plastic or aluminum. The teeth 52a of the pinion 52 engage the teeth 21a of the rack 21 (FIG. 6). When the pinion 52 is caused to rotate by the motor, the rack moves horizontally. Since the rack 21 is affixed to the window pane 34, as the rack moves horizontally, the window pane 34 slides towards either the fully opened or the fully closed position.

The inner pinion housing 54 (FIG. 7) fits over the corresponding flanges 17 of the bottom frame 28. The outer pinion cover 56 is attached to the inner pinion cover 54 by two screws 57 and two washers 59. For cosmetic purposes, the screws 55 are provided with screw covers 58. The pinion 52, pinion housings 54 and 56, screws 57 and washers 59 are assembled and attached to the bottom frame 28 and comprise the pinion assembly 50. The entire pinion assembly 50 is mounted on the frame so that the pinion 52 is opposite the left mullion 24 as shown in FIG. 3.

FIG. 7 also shows a protective cover 29 mounted along the bottom frame edge 28 to cover those portions of the rack 21 that extend beyond the pinion assembly 50. This protective cover prevents clothing and other items from becoming caught between the rack 21 and the pinion 52. The cover 29 is preferably made of extruded aluminum and is molded so to fit securely over the flanges 17 on the front portion of the bottom of the frame 28. For cosmetic purposes, the cover 41 extends along virtually the entire bottom of the frame 28.

A flexible power transmission cable 60 (FIG. 6) couples the motor 40 to the pinion 52. The power transmission cable may be of the type commonly used in speedometers in automobiles to link the sensor on the axle or wheels to the speedometer gauge. One of the more common such cables is a cable assembly available from Nagle Industries.

Figure 5A:
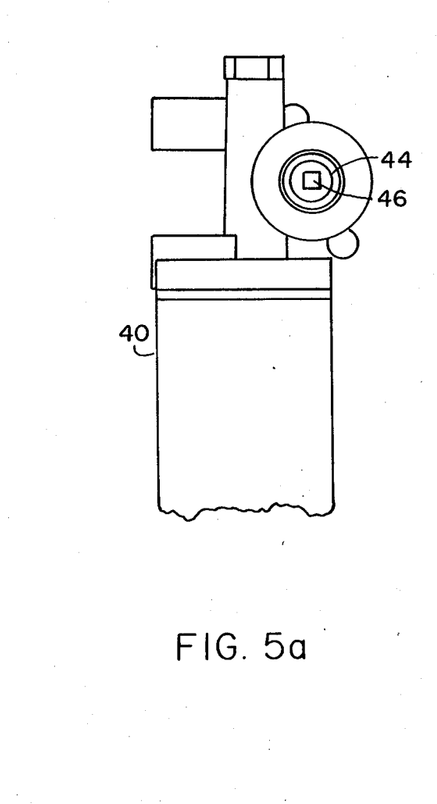
FIGS. 5A and 5B show front and side views of the motor and part of the power transmission cable of the first embodiment of the power window assembly.
Figure 5B:
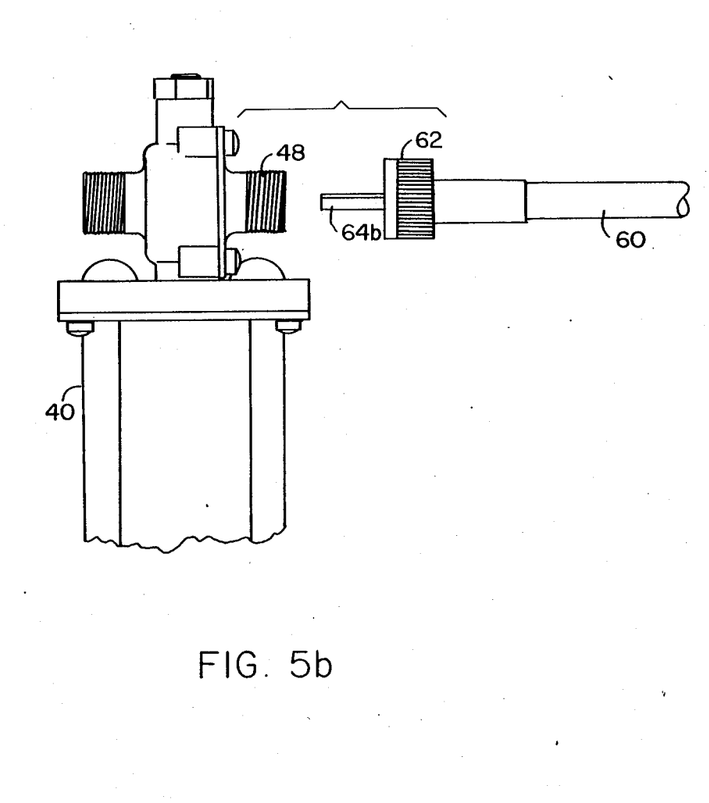

The cable 60 (FIG. 4) comprises a hollow exterior cable 66 and a spline (or elongated member) 64 which is longer than the hollow exterior cable 66. The spline 64 has a rectangular cross-section (see FIG. 6). The spline extends throughout the length of the hollow exterior cable 66 and beyond the ends 68 (FIG. 4) and 62 (FIG. 5B) of that exterior cable to form exposed spline ends 64a and 64b. As can be seen in FIG. 4, a bushing 61 inside the exterior cable 60 supports the spline 64.

An exposed end of the spline 64b (FIG. 5B) is attached to the motor 40 in a mating socket 46 defined by a rotating member 44 in the motor 40. A threaded exterior cable end 62 fastens onto matching threads 48 on the exterior of the motor 40. By unscrewing the cable end 62 from the motor 40 and pulling the exposed end 64b of the spline from the socket 46, the cable 60 may be readily detached from the motor.

The other end 64a of the spline 64 (FIG. 7) is firmly held in place by a mating socket 55 provided in the pinion 52. With the power cable thus coupling the motor to the pinion 52, the rotation of the rotating member 44 of the energized electric motor 40 causes the sliding pane 34 to slide. The spline 64 in the power transmission cable 60 rotates, thereby rotating the pinion 52. The teeth 52a of the pinion engage the teeth 21a of the rack 21 affixed to the sliding pane 34. Thus, if the energized motor rotates counterclockwise, the sliding window pane 34 will move towards a fully opened position. If the motor rotates in the opposite direction, the sliding pane 34 moves towards the fully closed position.

The ability to detach the cable end 68 from the motor 40 yields one of many advantages of the present invention. The type of motor suggested above can only rotate when the motor is energized. If the motor is deenergized, the rotating member 44 cannot rotate. Since the rotating member 44 cannot rotate, the spline 64 and the pinion 52 cannot rotate, preventing the rack 21—and therefore the sliding pane 34—from moving horizontally. Thus, manually attempting to push the sliding pane 34 towards the fully opened position when the motor 40 is deenergized will not open the window. Since the pane 34 will not generally slide while the motor 40 is deenergized, the window pane 34 may be left in a slightly opened position while the truck is parked without fear of thieves forcing open the window pane 34.

However, in the unlikely event that the power window assembly 10 were to fail such as if the motor 40 were to burn out, the window pane 34 may still be manually closed by the operator. The operator merely has to detach the cable 60 from the motor by unscrewing the end 68 and the sliding window pane 34 may readily be slid closed. Then to prevent thieves from opening the window, the cable end, which is inside the cab 1, may be reattached to the motor 40.

A second embodiment (not shown) of the present invention is identical to the first embodiment except that the motor 40 is directly coupled to the pinion 52 through a short axle (not shown). This allows for fewer parts.

Figure 8:
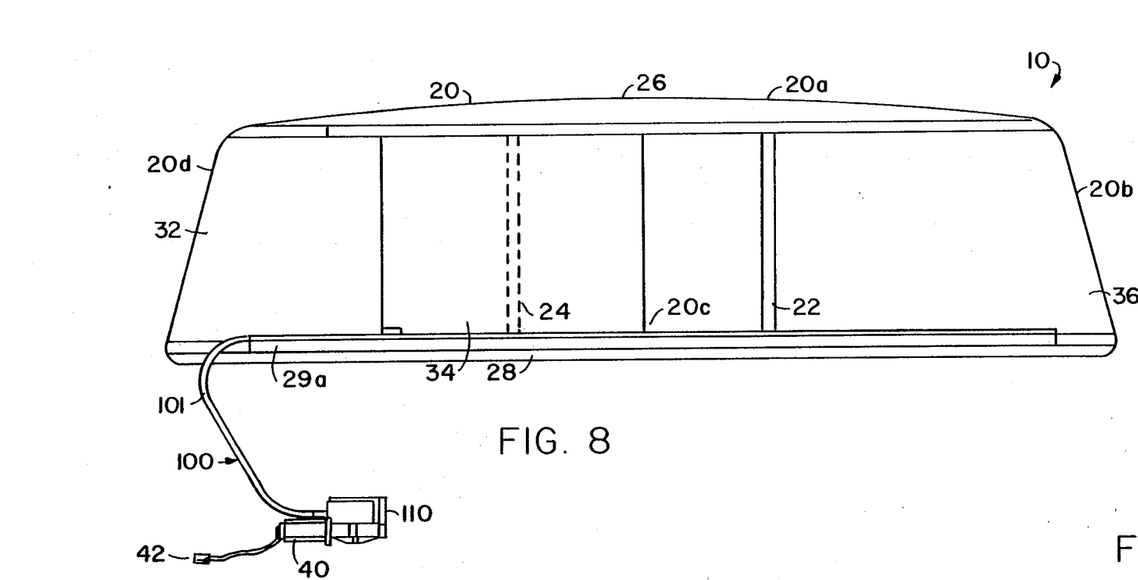
FIG. 8 is a front planar view of the third embodiment of the power window assembly. Parts in the embodiment of FIG. 8 that are substantially identical to the embodiment shown in FIG. 3 are labelled with the same numbers as those used in FIG. 3.

A third embodiment of the present invention uses a "pushpull" drive mechanism shown in FIG. 8. (Those parts in FIG. 8 that are substantially identical to the parts shown in FIG. 3 have been assigned the same numbers.) The fundamental difference between the first embodiment shown in FIG. 3 and the embodiment shown in FIG. 8 is that the power transmission cable 60 has been replaced by a push-pull drive cabling system 100.

Figure 11:
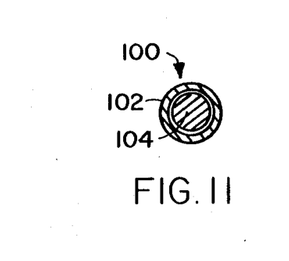
FIG. 11 is a sectional view taken along line 11—11 of in FIG. 8.

This push-pull drive mechanism uses a cable assembly 101 comprised of an external cable 102 that partially houses an interior cable 104 (See FIG. 11). The interior cable 104 couples a transmission drive 110 mated to the motor 40 to the sliding window pane 34. In this instance, the preferred motor is also a 12 Volt D.C. right angle gear motor such as those available from United Technologies Electro Systems. The external cable is made of teflon while the interior cable is made of nylon. To open the sliding window pane 34, the transmission drive 110 retracts a portion of the interior cable 104 into a transmission drive case 114. This, in effect, shortens the length of the interior cable 104 that is outside of the transmission case 114. Since the sliding window pane 34 is attached to the interior cable 104, the sliding window pane 34 is pulled towards the fully opened position.

To close the sliding window pane 34, a portion of the interior cable 104 contained within the case 114 is expelled or pushed out of the case 114. This effectively lengthens the portion of the interior cable 104 that is outside of the case 114. Since the external hollow cable 102 prevents the interior cable from bending, the window is pushed towards the closed position as the portion of the interior cable 104 outside of the case 114 lengthens.

Figure 9:
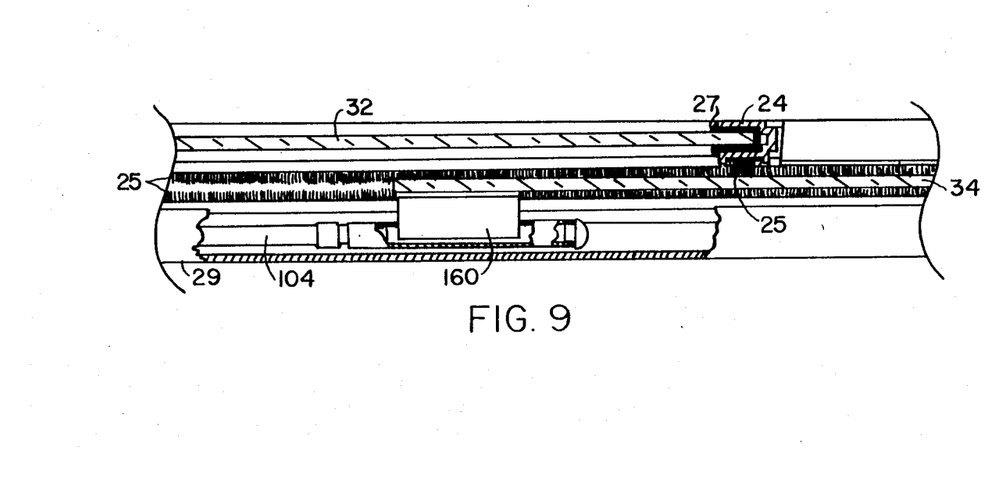
FIG. 9 is a partial sectional view taken along line 9—9 in FIG. 8.
Figure 10:
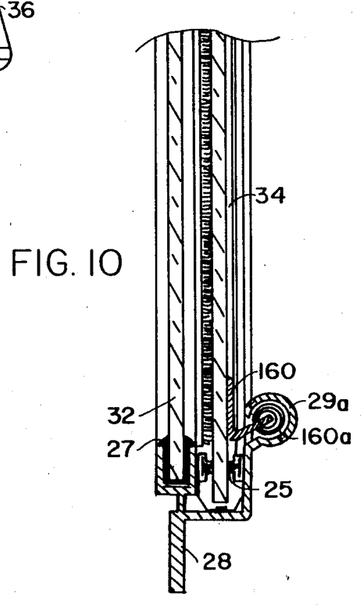
FIG. 10 is a partial sectional view taken along line 10—10 in FIG. 8.

FIGS. 9 and 10 show how the interior cable 104 is secured to the window pane 34. An attachment block 160 having a substantially "V" shaped cross section is secured to the sliding window pane 34 along the front bottom edge. The block 160 is preferably made of aluminum and may be affixed to the window pane 34 by a glass adhesive such as those that are available from LOC-TITE. The portion of the block that is remote from the window pane includes a hollow cylindrical member 160a. During assembly, an end of the interior cable 104 is inserted into the cylindrical member 160a and the member is compressed to securely hold that end of the interior cable 104. The cylindrical member 160a and the portion of the interior cable 104 housed within the frame move in the cosmetic hollow cylinder 29a formed along the bottom frame 28.

Since the interior cable 104 is attached to the sliding window pane 34 by the block 160, retracting a portion of the cable 104 into the transmission drive case 114 pulls the window towards the fully opened position. However, pushing a portion of the cable 104 out of the case 114, pushes the sliding window pane 34 to the fully closed position.

Figure 12:
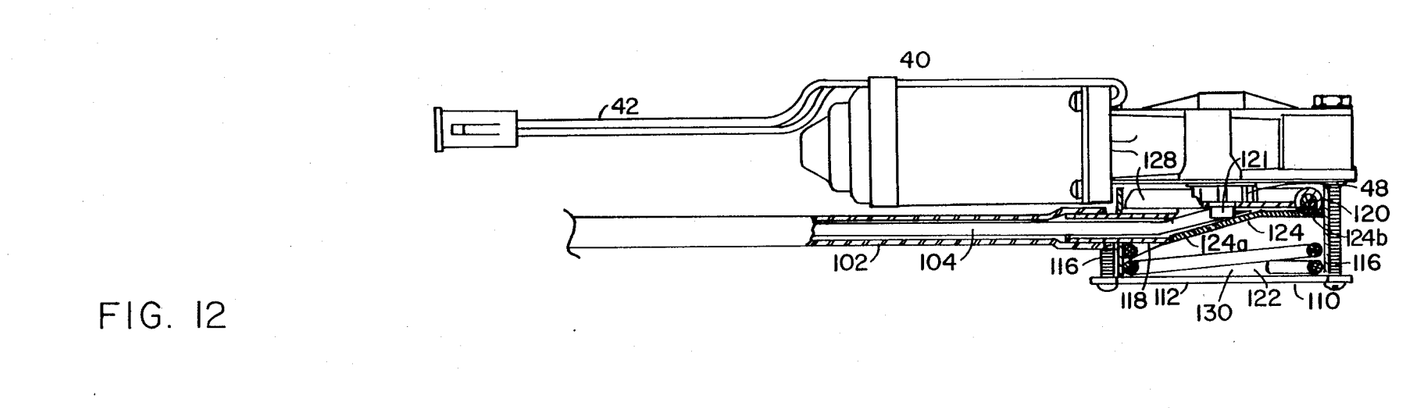
FIG. 12 is a partial sectional view of the motor and transmission drive shown in FIG. 8.
Figure 13:
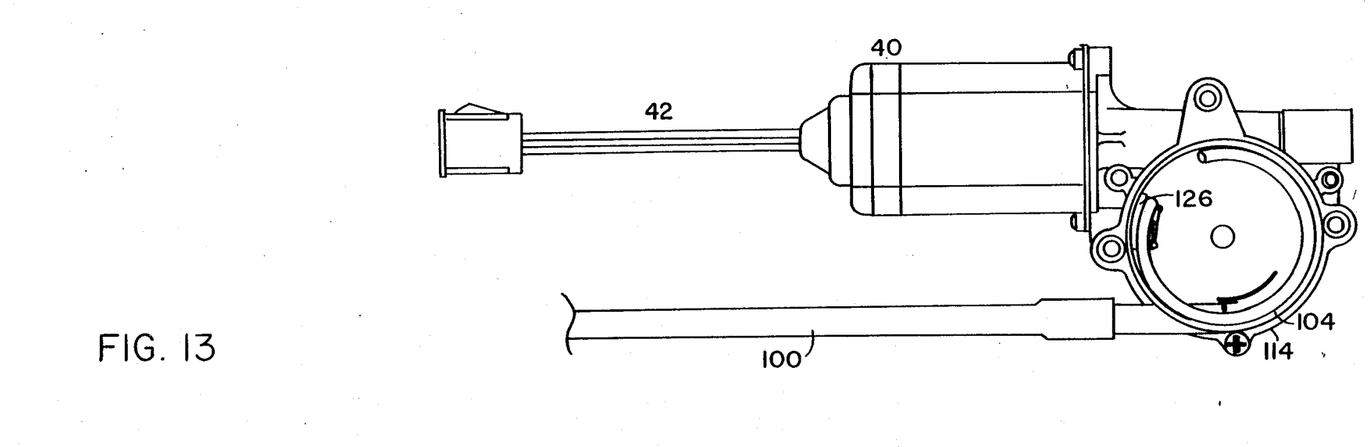
FIG. 13 is a top planar view of the motor and transmission drive shown in FIG. 8 with the cover 112 removed.

FIGS. 12 and 13 show additional details on how the transmission drive 110 controls the cable assembly 100 to open and close the window. The transmission drive case 114 is attached to the motor via bolts 116, which also secures a case cover 112 to the case. The case 114 defines an entry tunnel 118 through which the interior cable 104 passes. The external cable 102 is secured to the exterior of the case 114 by fitting the end of that cable 102 about the portion of the case that defines the entrance to the tunnel 118.

The interior cable 104 passes through the entry tunnel 118 and into the case 114 next to the cross plate 124. At that point 124a, the cross-member 124 is angled to guide the interior cable 104 towards a tunnel formed between a tunneled disc 120 and the flat section of the cross-member 124b. The tunnel formed between the tunneled disc 120 and the cross-member 124 guides the interior cable 104 to the case tunnel 126 which opens into a lower chamber 130 of the transmission drive 110. The cross-member divides an upper chamber 128 of the transmission drive 110 from a lower chamber 130.

The cross-member 124 and the tunneled disc 120 cooperate to create the push-pull action of the transmission drive. The disc 120 and the flat portion of the cross-member 124b form a tunnel in which a portion of the interior cable 104 lies. The cable contacts both the tunneled section of the disc 120 and the cross-member 124. The disc 120 is also coupled via a drive shaft 121 to the motor 40. When the motor 40 rotates clockwise, the disc 120 and the cross-member 124 cooperate to push a portion of the interior cable 104 out of the transmission drive. When the motor 40 rotates counter-clockwise, the disc 120 and the cross-member cooperate to retract more of the interior cable 104 into the transmission drive 114. The additional portion of the cable that is retracted into the case 114 is stored in the lower chamber 130 as shown in FIG. 12.

Figure 15:
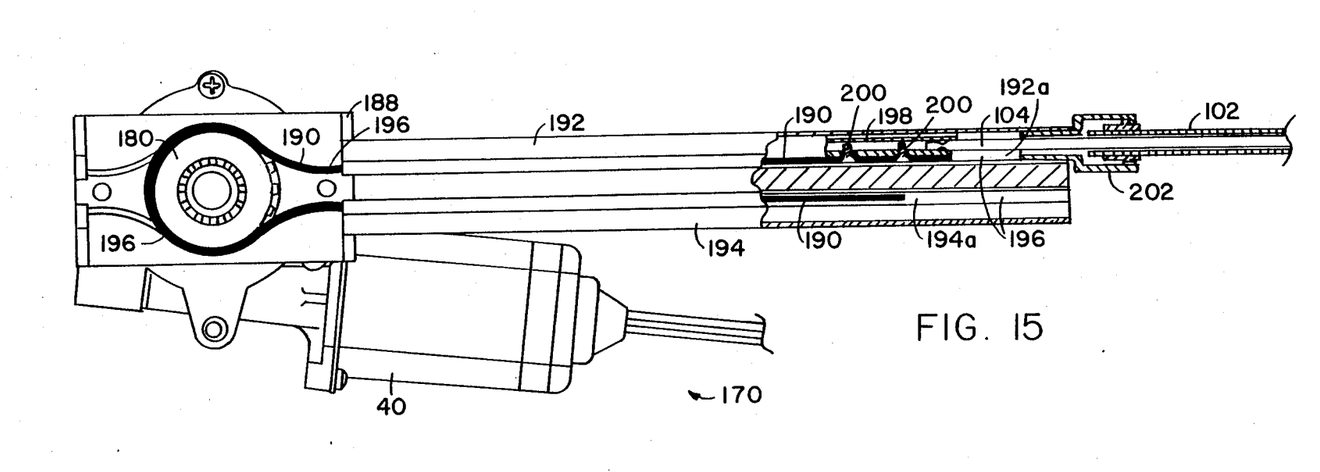
FIG. 15 is a partial sectional view of an alternative to the drive mechanism shown in FIGS. 12 and 13 with the case removed for the purpose of clarity.
Figure 16:
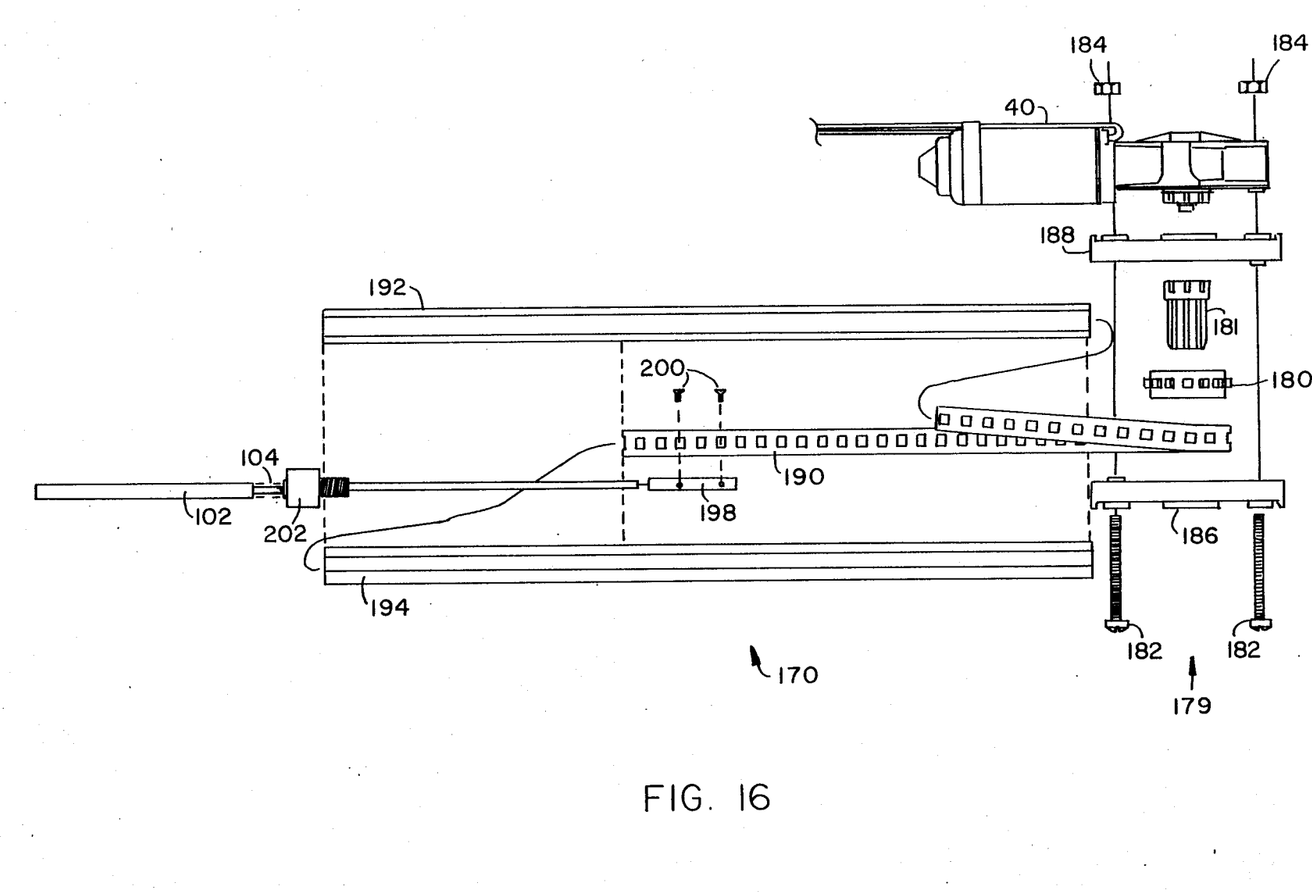
FIG. 16 is an exploded view of the drive mechanism shown in FIG. 15.

FIGS. 15 and 16 show an alternative, preferred drive mechanism 170 for providing a push-pull mechanism. The entire drive mechanism 170 is housed in a case (not shown for reasons of clarity). The motor 40 is coupled to a toothed gear wheel 180 by a gear coupler 181. The teeth of the gear wheel 180 engage a perforated or slotted tape 190 that is coupled to the interior cable 104. As the gear wheel rotates counterclockwise, the tape 190 retracts or pulls a portion of the interior cable 104 into the case (not shown), thereby moving the window pane 34 towards the fully opened position. When the motor 40 reverses and rotates the gear wheel 180 clockwise, the tape 190 pushes a portion of the interior cable 104 from the case (not shown) to thereby move the sliding window pane 34 towards the fully closed position.

The gear wheel 180 is held in place by a top gear cover 186 and a bottom gear cover 188. Gear box screws 182 and nuts 184 secure the entire gear box assembly 179 to the motor 40. The top gear cover 186 and the bottom gear cover 188 define entry and exit channels to form part of a tape path 196 to hold the slotted tape 190.

The slotted tape 190 may be made of any flexible material, including such plastics as polyamides (nylons) and polyurethanes (including teflon). Dymetrol, which is the trademark name of a plastic manufactured by DuPont has been found to be a material well suited for forming the tape 190.

A portion of the slotted tape 190 is held in each of a top and bottom tape channels 192 and 194. These top and bottom tape channels 192 and 194 each have a T-shaped cross section and are hollow. The tape is fitted into the hollow crossbar portions 192a and 194a of the channels. These crossbar portions, together with the entry and exit channels defined by the gear box assembly 191, define the tape path 196. The tape 190 moves from being mostly in the bottom tape channel 194 when the window pane 34 is in the fully opened positioned to being mostly in the top channel 192 when the window pane 34 is in the fully closed position.

To secure the tape 190 to the interior cable 194, a metallic interior cable coupler 198 and coupler screws 200 are used. The end of the interior cable is inserted into a hollow cylindrical housing on the coupler 198 and that housing is then crimped around the end of the interior cable 104. The screws 200 then secure the coupler 198 to the tape 190. The coupler 198 also serves as a stop to prevent the gear wheel 180 from advancing past the end of the tape 190 when the wheel is rotating counterclockwise. Also, to prevent the gear wheel 180 from advancing the tape 190 past the opposite end while rotating clockwise, a metallic stop (not shown) may be attached to the opposite end of the tape.

For safety, the transmission drive may be inserted into a case (not shown). An external cable coupler 202 coupled to the exterior cable 102 may be secured to either the case (not shown) or to the channel 192. In addition, it may be desirable to line the case with styrofoam or other sound absorbing materials to reduce the noise produced by the unit.

A particular advantage of both the power transmission cable and the push-pull embodiments is that the power transmission cable may be of a length that allows placement of the motor far from the window and the heads of the driver and passengers. Thus the driver and passengers hear less noise from the motor during its operation. Also the motor may be mounted at any convenient point in the truck cab. Wires may be provided so that the power means may be controlled by movement of a three position switch mounted on the dashboard.

The power window assembly of the present invention has additional advantages. For example, the direct drive of the invention encompasses a simple design and few parts and therefore is less likely to break down. Furthermore, a burned out motor, broken transmission cable or snapped pinion can be fixed easily or can be replaced easily by the owner. The assembly may be installed by the owner relatively easily as well.

Further advantages are attained because the motor and cable mechanisms prevent thieves from prying open the window. When the motor is not energized, it prevents the window from being manually pushed open. Yet in the case of a failure, the cable may be readily detached from the motor; at that point the owner can manually operate the window to close the window, if for example, the unit failed while the window was in the opened position.

Yet another advantage of the power window assembly of the present invention is its cost. Due to the simplicity of its design, the assembly may be manufactured, and therefore sold, at approximately one-third the cost of prior art power modules. The unit will cost only slightly more than the manual prior art designs.

Although three specific embodiments of the invention have been described, various modifications and variations within the scope of the invention will be apparent to one skilled in the art. For example, the design may be adapted for use with a window positioned between the front and rear seats of a limousine or the like or may be mounted in larger trucks or may be mounted anywhere a horizontally sliding window is desired. Also, the number of fixed and sliding panes be varied and the material used for the components may be changed. Therefore, this invention is not to be limited to the specific embodiments discussed and illustrated herein, but rather by the following claims.

What is claimed is:

1. A power window replacement assembly for the rear window opening of a truck cab or the like, comprising:
   a frame having at least two opposed sides and having substantially the same shape as the window opening;
   three window panes housed within the frame, wherein a first pane is fixedly mounted in the frame to form the first side of the frame, a second pane is fixedly mounted to form part of the second side of the frame and a third sliding pane is mounted in the frame, the third sliding pane being adapted to slide at least partially past the first fixed pane in a first horizontal direction to a fully opened position and to slide in a second horizontal direction to a closed position wherein when the sliding pane is moved to its fully closed position, the three panes filling the frame when the sliding pane is in the closed position;
   an electrical motor;
   an engagement means affixed to the sliding pane; and
   a drive engagement means coupled to the motor and mounted at least partially in the frame and contacting the engagement means for moving the engagement means in the first and second horizontal directions.

2. A power window replacement assembly described in claim 1, wherein the drive means is coupled to the motor by a power transmission cable.

3. A power window replacement assembly as described in claim 2, wherein the engagement means is affixed to the sliding pane in a horizontal position along the bottom side of the panel.

4. A power window replacement assembly as described in claim 3, wherein the engagement means is a rack and the drive means includes a pinion coupled to the rack.

5. A power window assembly as described in claim 1, wherein the drive means comprises a means for pushing the engagement means in a first direction towards a fully closed position and for pulling the sliding pane in a second direction towards a fully opened position.

6. A power window assembly as described in claim 5, wherein the means for pushing and pulling further includes a first hollow cable attached to the frame and to the motor and a second cable partially housed within the hollow cable, the second cable being coupled to the drive means and coupled to the engagement means.

7. A power window replacement assembly of claim 1, wherein the drive means comprises:
a length of hollow cable having first and second ends and
an elongated rotating member longer than the cable and having first and second ends, wherein the elongated rotating member is partially housed with the first end of the rotating member coupled to the motor and the second end coupled to the engagement means.

8. A power window replacement assembly as described in claim 7,
wherein the motor has a coupling member that rotates whenever the motor is energized and a partially threaded housing that surrounds the rotating member, said coupling member defining a threaded socket, and
wherein the cable further includes a threaded cap at the first end adapted to engage the threads of the housing and the elongated rotated member has threads adapted to engage the threads of the socket to thereby fasten the cable to the motor.

9. A power window replacement assembly as described in claim 1, wherein the frame further includes a vertical mullion forming a protective flange across the vertical edge of the slidable glass pane whenever the window is in the fully closed position to prevent the prying opened of the slidable pane.

10. A power window replacement assembly for the rear window opening of a truck cab or the like having an electrical power system, comprising:
a frame having substantially the same shape as the window opening;
a pane being slidably disposed with the frame to slide between an opened and closed position in the frame;
an electric motor adapted to be coupled to the power system of the truck cab, the motor adapted to cause movement in a first direction and in a reverse direction; and
a transmission cable coupled between the motor and the sliding window pane to move the pane within the frame, the transmission cable comprising:
an outer hollow cable positioned between the motor and the pane, said cable being made of teflon;
an interior cable having two opposed ends, said interior cable being slidably disposed at least partially within the outer cable, the first end being affixed to the window pane, said interior cable being made of nylon; and
transmission drive means affixed to the motor and the second end of the interior cable for sliding the interior cable in a first direction and in a reverse direction depending upon the direction of movement in the motor, wherein the window is caused to slide between the opened and closed positions said transmission drive means including means for retracting a portion of the interior cable into the transmission drive means wherein the sliding window pane is moved to the opened position and for pushing out a portion of the interior cable from the transmission drive means wherein the sliding window pane is moved to the closed position said transmission drive means further including
a chamber mounted in a fixed position relative to the motor,
a cross-member held in a fixed position in the chamber, and
a rotating disc having a flat surface adjacent to the flat cross-member and coupled to the motor, wherein a first portion of the interior cable is positioned in a contacting relationship with both the rotating disc and the flat cross-member such that when the rotating disc rotates in a first direction, more of the interior cable is retracted into the chamber thereby moving the slidable window pane towards the fully opened position and when the rotating disc rotates in the opposite direction, more of the interior cable is pushed from the chamber, thereby moving the window towards the closed position.

11. A power window assembly as defined in claim 10, wherein
the first cross-member divides the chamber into an upper and lower portion and the cross-member defines a first passage communicating between the two portions through which a portion of the interior cable passes; and
the chamber defines an entry tunnel to which the outer hollow cable is coupled and through which a portion of the interior cable passes.

12. A power window assembly as described in claim 11, wherein
the second member defines a second passage with the first member with the first portion of the interior cable contained within the second passage.

* * * * *